United States Patent
Wu et al.

(10) Patent No.: US 8,498,478 B2
(45) Date of Patent: Jul. 30, 2013

(54) SCENARIO SIMULATION SYSTEM AND METHOD FOR A MULTIMEDIA DEVICE

(75) Inventors: Chine-Ching Wu, Taipei (TW); Jiunn-Shyang Wang, Taipei (TW); Seng-Che Tsao, Taipei (TW)

(73) Assignee: Via Technologies, Inc., Hsin-Tien, Taipei (TW)

( * ) Notice: Subject to any disclaimer, the term of this patent is extended or adjusted under 35 U.S.C. 154(b) by 1216 days.

(21) Appl. No.: 11/768,943

(22) Filed: Jun. 27, 2007

(65) Prior Publication Data
US 2008/0056530 A1 Mar. 6, 2008

(30) Foreign Application Priority Data
Sep. 4, 2006 (TW) ................. 95132572 A (51) Int. Cl.
G06K 9/00 (2006.01)
G06K 9/34 (2006.01)
(52) U.S. Cl.
USPC .......................................... 382/173; 382/100
(58) Field of Classification Search
None
See application file for complete search history.

(56) References Cited

U.S. PATENT DOCUMENTS

| | | | | |
|---|---|---|---|---|
| 4,448,200 A * | 5/1984 | Brooks et al. | ................. | 600/425 |
| 5,566,251 A * | 10/1996 | Hanna et al. | ................. | 382/284 |
| 5,574,511 A * | 11/1996 | Yang et al. | ................. | 348/586 |
| 5,592,236 A * | 1/1997 | Rosenbaum et al. | ......... | 348/586 |
| 5,764,306 A * | 6/1998 | Steffano | ......................... | 348/586 |
| 5,781,198 A * | 7/1998 | Korn | ................. | 345/634 |
| 5,900,953 A * | 5/1999 | Bottou et al. | ................. | 358/540 |
| 5,907,315 A * | 5/1999 | Vlahos et al. | ................. | 382/167 |
| 5,913,019 A * | 6/1999 | Attenberg | ................. | 358/1.18 |
| 6,005,967 A * | 12/1999 | Nakagawa et al. | ........... | 382/154 |
| 6,201,581 B1 * | 3/2001 | Moriwake et al. | ........... | 348/587 |
| 7,227,567 B1 * | 6/2007 | Beck et al. | ................. | 348/14.07 |
| 7,672,482 B2 * | 3/2010 | Bolin et al. | ................. | 382/103 |
| 2002/0186881 A1 * | 12/2002 | Li | ................. | 382/164 |
| 2003/0222888 A1 * | 12/2003 | Epshteyn | ................. | 345/619 |
| 2003/0223622 A1 * | 12/2003 | Simon et al. | ................. | 382/118 |
| 2004/0125423 A1 * | 7/2004 | Nishi et al. | ................. | 358/537 |
| 2004/0194127 A1 * | 9/2004 | Patton et al. | ................. | 725/32 |
| 2005/0129324 A1 * | 6/2005 | Lemke | ................. | 382/254 |
| 2006/0072041 A1 * | 4/2006 | Kii | ................. | 348/586 |
| 2008/0030621 A1 * | 2/2008 | Ciudad et al. | ................. | 348/586 |
| 2008/0200261 A1 * | 8/2008 | Spittle et al. | ................. | 463/43 |

FOREIGN PATENT DOCUMENTS

| | | |
|---|---|---|
| TW | 313658 | 8/1997 |
| TW | I239190 | 9/2005 |
| TW | 200606811 | 2/2006 |

OTHER PUBLICATIONS

Mihran Tuceryan and Ail K. Jain, "Texture Analysis", in "The Handbook of Pattern Recognition and Computer Vision", 1998.*
TW Office Action mailed Mar. 9, 2010.
English abstract of TWI239190, pub. Sep. 1, 2005.
English abstract of TW313658, pub. Aug. 21, 1997.
English abstract of TW200606811, pub. Feb. 16, 2006.

* cited by examiner

*Primary Examiner* — Li Liu
(74) *Attorney, Agent, or Firm* — McClure, Qualey & Rodack, LLP (57) ABSTRACT

A scenario simulation system for a multimedia device is disclosed. An outline detection device separates a plurality of images from an image source to a plurality of foreground and background images which are stored in a foreground storage medium and a background storage medium respectively. A foreground selector selects a foreground image, and a background selector selects a background image. An image mixer mixes the foreground image with the background image as an output image. An image output module transmits the output image for replacing a real image to a remote multimedia device.

29 Claims, 9 Drawing Sheets

SCENARIO SIMULATION SYSTEM AND METHOD FOR A MULTIMEDIA DEVICE

BACKGROUND OF THE INVENTION

1. Field of the Invention

The invention relates to a multimedia device, and more particularly to a scenario simulation system and method for a multimedia device.

2. Description of the Related Art

Multimedia phones provide variety of different applications. Scenario mode is a popular feature offered on many multimedia phones. Scenario mode enables rapid switching between various operational modes. Each operational mode comprises display settings, such as brightness, contrast, and audio output, optimized for various applications, including official dispatch, video, and game applications. A multimedia phone may also provide a video application that allows a user to be seen by the other remote users through dynamic images while communicating. The video application, however, can be disabled if the user does not want to be seen while communicating.

Thus, a scenario simulation system and method for a multimedia device is desirable, showing predefined or simulated images while communicating.

BRIEF SUMMARY OF THE INVENTION

Scenario simulation systems for a multimedia device are provided. An exemplary embodiment of a scenario simulation system comprises an outline detection device, a foreground storage medium, a background storage medium, a foreground selector, a background selector, an image mixer, and an image output module. The outline detection device analyzes and separates a plurality of images retrieved from an image source to a plurality of foreground and background images. The foreground storage medium stores the foreground images. The background storage medium stores the background images. The foreground selector selects a foreground image from the foreground storage medium. The background selector selects a background image from the background storage medium. The image mixer mixes the foreground image with the background image as an output image. The image output module transmits the output image for replacing a real image to a remote multimedia device.

Scenario simulation methods for a multimedia device are provided. An exemplary embodiment of a scenario simulation method for a multimedia device comprises the following steps. A plurality of images is retrieved from an image source. The images are analyzed and separated into a plurality of foreground and background images. One of the foreground images and one of the background images are selected based on different conditions. The foreground image is mixed with the background image as an output image.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

Several exemplary embodiments of the invention are described with reference to FIGS. 1 through 4D, which generally relate to scenario simulation. It is to be understood that the following disclosure provides various different embodiments as examples for implementing different features of the invention. Specific examples of components and arrangements are described in the following to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various described embodiments and/or configurations.

Figure 1:
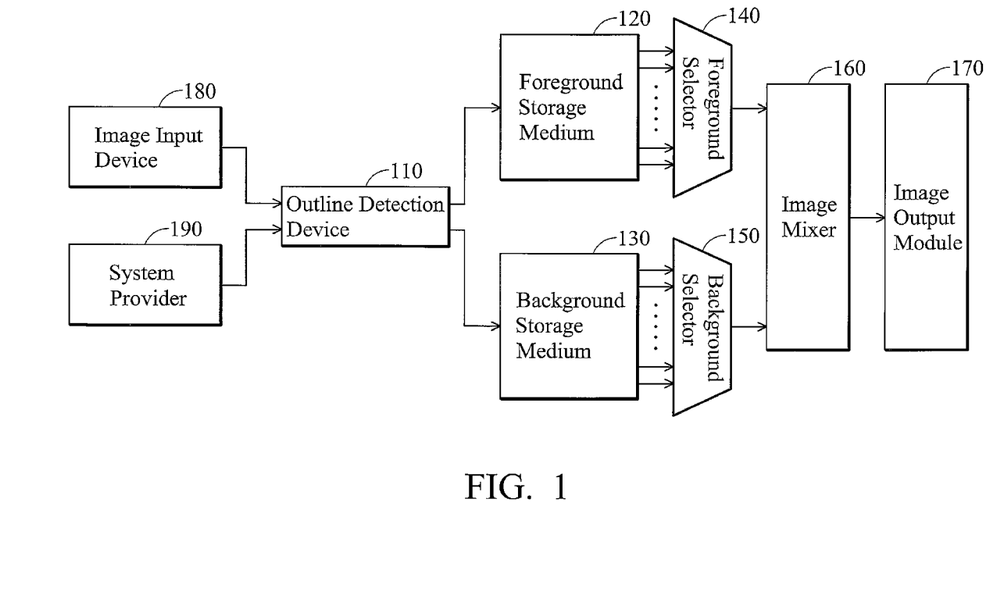
FIG. 1 is a schematic view of an embodiment of a scenario simulation system and method for a multimedia device.

The invention discloses a scenario simulation system and method for a multimedia device. An embodiment of a multimedia device takes, but is not limited to, a cellular phone as an example. FIG. 1 is a schematic view of an embodiment of a scenario simulation system and method for a multimedia device. A scenario simulation system for a multimedia device comprises an outline detection device 110, a foreground storage medium 120, a background storage medium 130, a foreground selector 140, a background selector 150, an image mixer 160, and an image output module 170.

Outline detection device 110 may be a special photo lens or a figure divider, analyzing and separating a plurality of images retrieved from an image source, wherein the image source is taken by an image input device 180 (such as a digital camera, a conventional film camera, and the like), to a foreground image and a background image, or retrieving a selected image 190 provided by a system provider to be a foreground image or a background image. Outline detection device 110 analyzes and separates the images using, but is not limited to, an outline detection method, a pattern matching method, or a fixed background abstraction method, which are well known and are not further described in the following. The image outline detection is mainly applied to outline detection on human faces, comprising feature extracting, outline modeling, texture constraining, and criterion detecting and connecting. Outline modeling detects different features based on characteristics of different models to retrieve outlines. Texture constraining is collocated to constrain textures that are hard to be removed by the outline modeling, for extracting outlines effectively. To obtain more accurate critical points, the outline is rendered based on a plurality of rectified critical points which are corrected by directional characteristics of the critical points after the critical points are obtained, and the overall outline is rendered based on the rectified critical points. The pattern matching determines score degrees of an outline image to implement measurement or numeric comparison for calculating increment amount of each pixel of compared images. In this embodiment, a character is compared with a reference character in a movie. The fixed background abstraction extracts foreground frames (such as characters, themes, and so forth) and background frames (such as landscapes, airports, train stations, and so forth), respectively, according to color keys. Separated foreground and background images are stored in foreground storage medium 120 and background storage medium 130 respectively.

Foreground selector 140 and background selector 150 select foreground images and background images from foreground storage medium 120 and background storage medium 130 respectively according to different conditions, such as incoming phone numbers, user selections, or random.

Image mixer 160 mixes a foreground image selected by foreground selector 140 with a background image selected by background selector 150 as an output image. Alternatively, outline detection device 110 extracts a real-time image (a currently retrieved real image of the user) from image input device 180 to be a foreground image. Image mixer 160 can also mix the real-time image (the foreground image) with a background image retrieved by background selector 150 as a simulation image. Additionally, outline detection device 110 can extract a real-time image (a currently retrieved real image of the user's location) from image input device 180 to be a background image. Inage mixer 160 mixes the real-time image (the background image) with a foreground image retrieved by foreground selector 140 as another simulation image.

Image output module 170 displays mixed images on a panel of the multimedia device or transmits mixed images to a remote multimedia device.

In this embodiment, each of the foreground storage medium 120 and background storage medium 130 can be a flash memory or dynamic random access memory (DRAM). Each of the foreground selector 140 and background selector 150 can be a multiplexer.

Figure 2A:
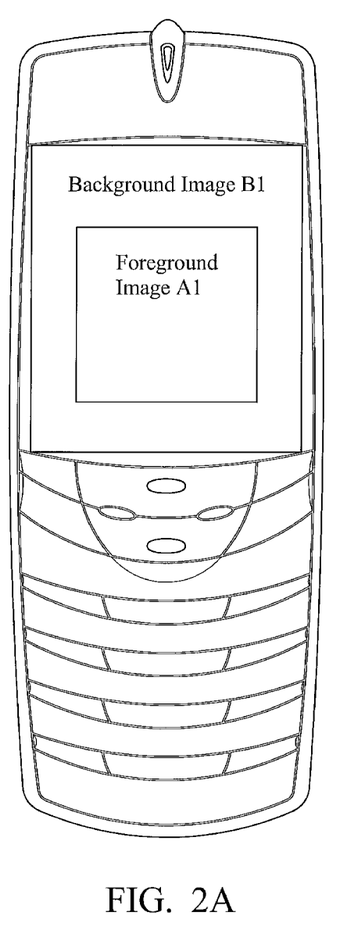
FIGS. 2A~2C are schematic views of an example of the scenario simulation system.
Figure 2B:
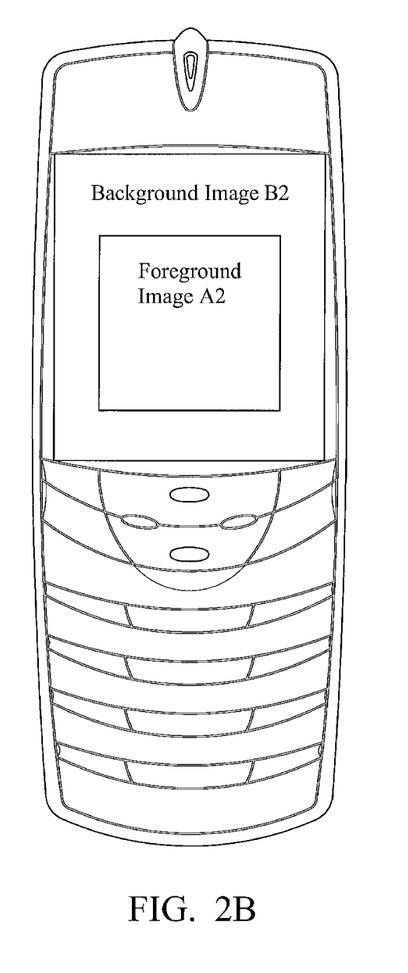

Referring to FIG. 2A, images of a local user displayed on a multimedia device of a terminal (remote) user are presented as a foreground image A1 and a background image B1. If the human image and a real location of the local user are hidden while communicating with the remote user, the local user selects a foreground image A2 and a background image B2 from foreground storage medium 120 and background storage medium 130 using foreground selector 140 and background selector 150 and mixes foreground image A2 and background image B2 as a simulation image using image mixer 160. The simulation image is then transmitted using image output module 170, and displayed on the multimedia device of the remote user, as shown in FIG. 2B.

Figure 2C:
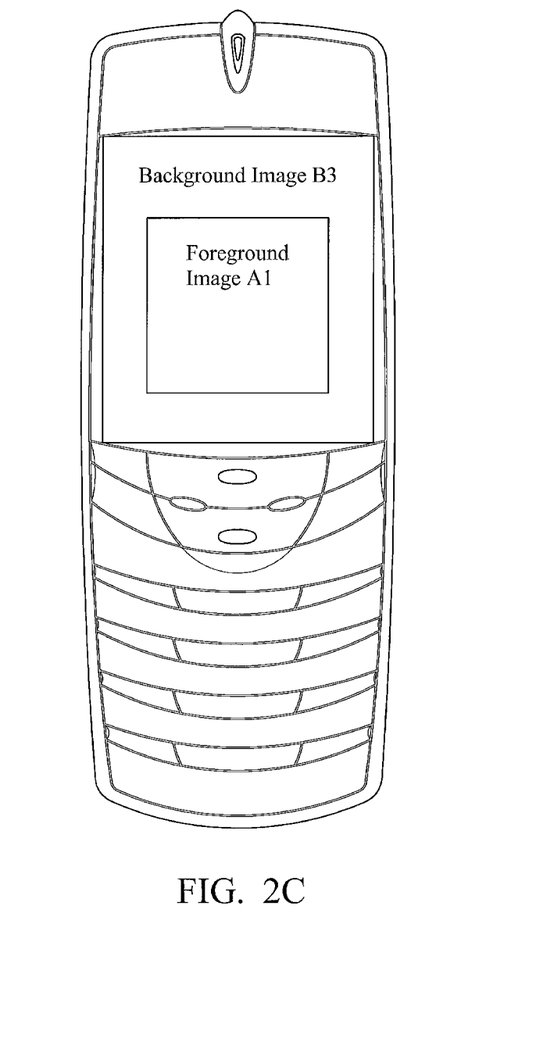

If the real location of the local user is hidden while communicating with the remote user, the local user abstracts foreground image A1 thereof using outline detection device 110, selects a background image B3 from background storage medium 130 using background selector 150, and mixes foreground image A1 and background image B3 as a simulation image using image mixer 160. The simulation image is then transmitted using image output module 170, and displayed on the multimedia device of the remote user, as shown in FIG. 2C.

Figure 3:
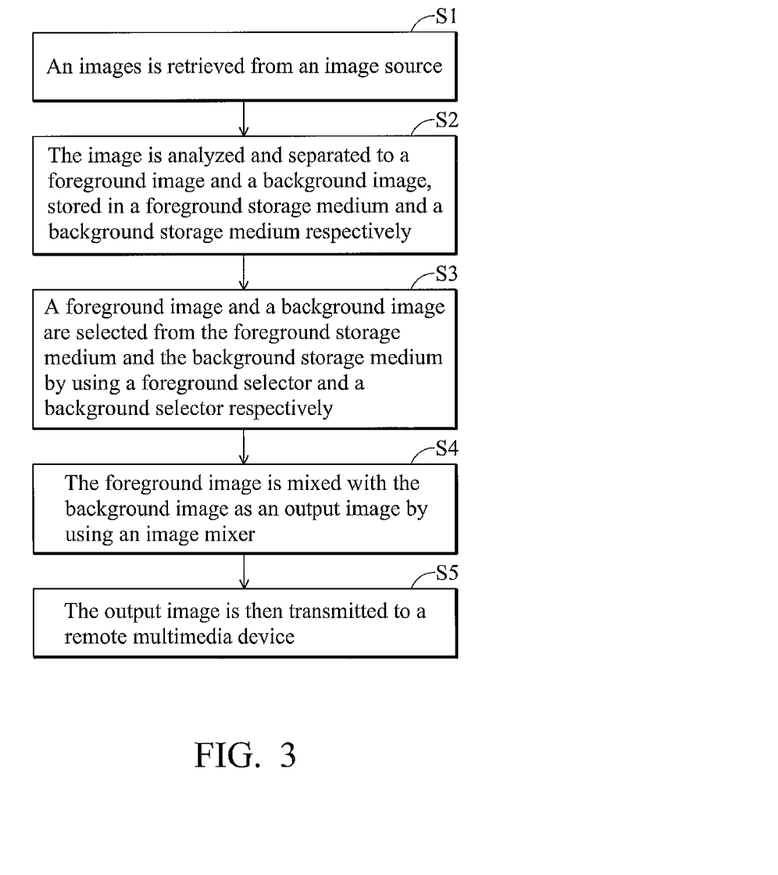
FIG. 3 is a flowchart of an embodiment of a scenario simulation method for a multimedia device.

FIG. 3 is a flowchart of an embodiment of a scenario simulation method for a multimedia device.

An image is retrieved from an image source (step S1), such as a digital camera, a photo camera, or a system provider. The image is analyzed and separated to a foreground image and a background image, stored in a foreground storage medium and a background storage medium respectively (step S2). The foreground storage medium and the background storage medium store a plurality of foreground images and background images respectively. A foreground image and a background image are retrieved from the foreground storage medium and the background storage medium using a foreground selector and a background selector respectively (step S3). The foreground image is mixed with the background image as an output image using an image mixer (step S4). The output image is then transmitted to a remote multimedia device (step S5).

Figure 4A:
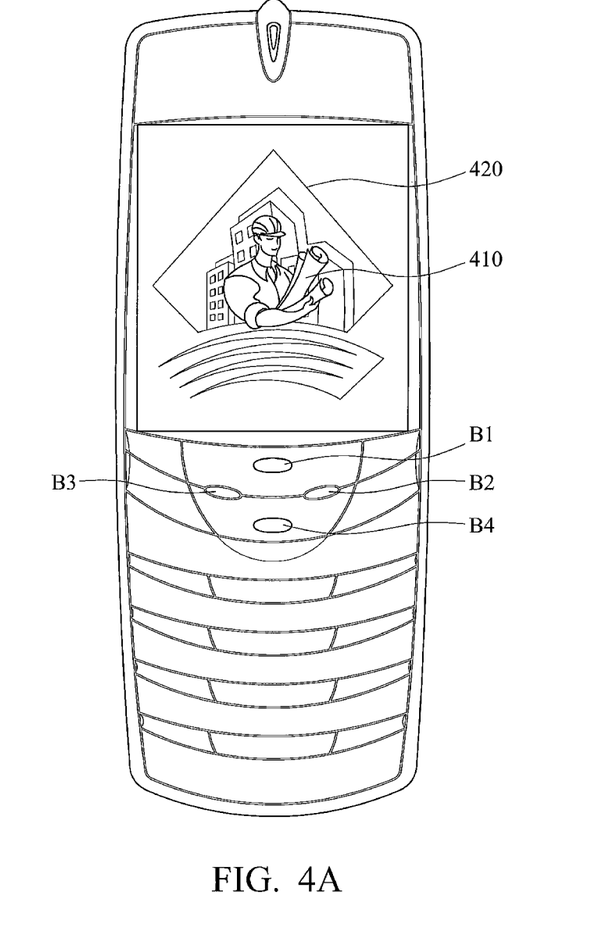
FIGS. 4A~4D are schematic views of another example of the scenario simulation system.

Referring to FIG. 4A, a scenario simulation application is activated using button $B_1$. When the scenario simulation application is activated, different buttons can be pressed to implement corresponding scenario simulation operations. In this embodiment, button $B_2$ is pressed to replace a real foreground image with a selected image, button $B_3$ is pressed to replace a real background image with a selected image, and button $B_4$ is pressed to replace both the real foreground and background images with selected images.

Figure 4B:
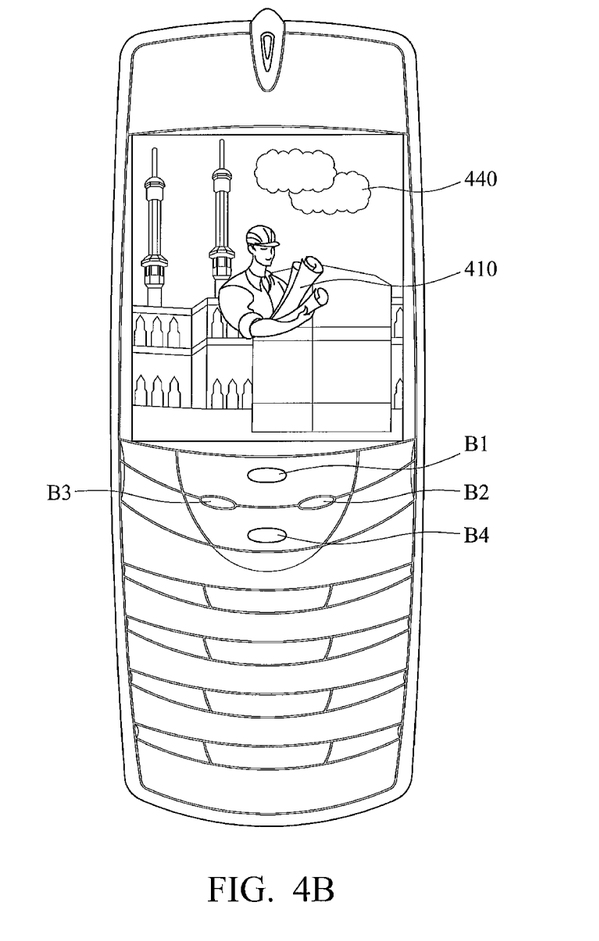
Figure 4C:
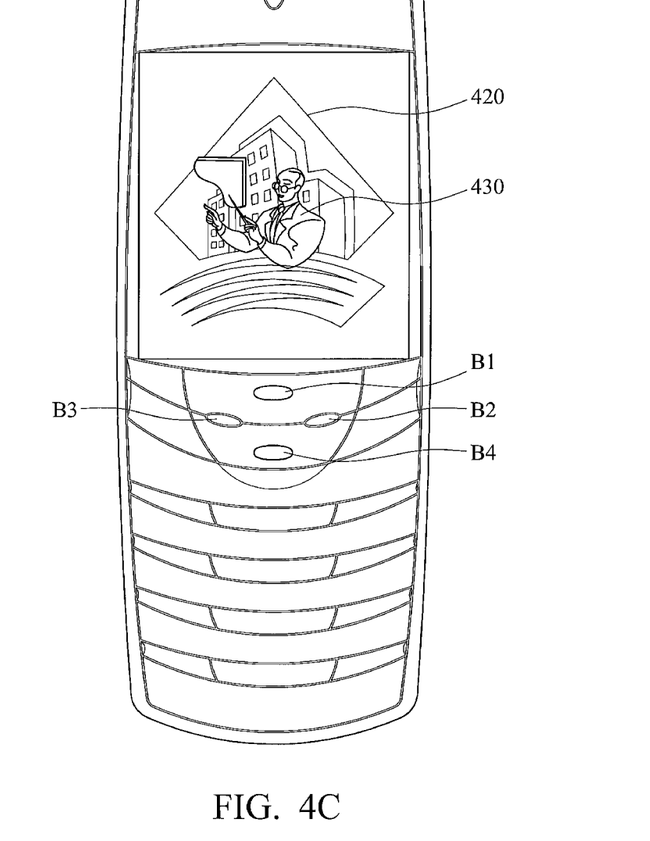
Figure 4D:
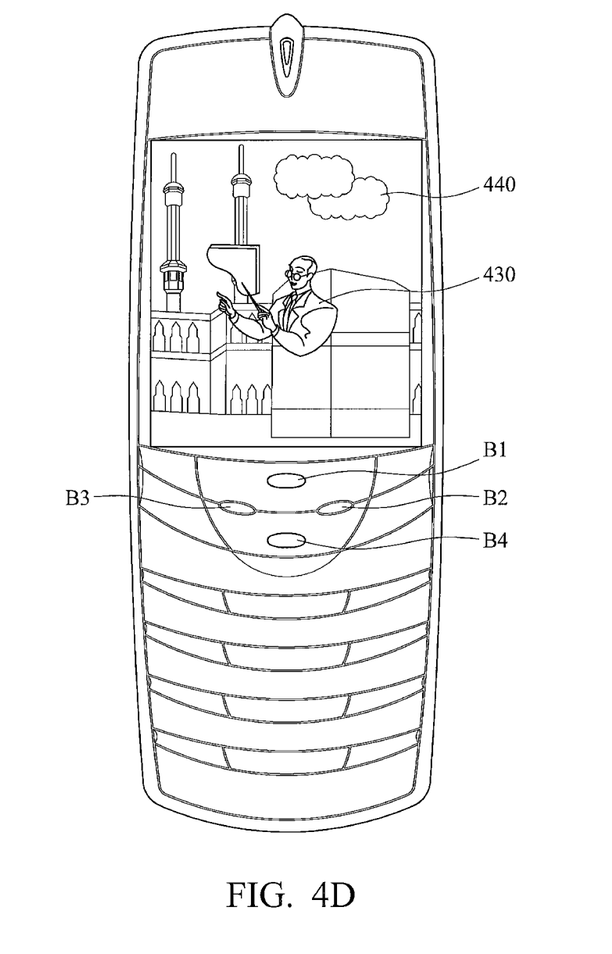

Referring to FIG. 4A, a user image indicates a real foreground image 410 and a real location image indicates a real background image 420. If the real location (the real background image) of the user is hidden, the user can press button $B_3$ to replace the real background image 420 with a selected image (a background image 440), as shown in FIG. 4B. If the user image (the real foreground image) is hidden, the user can press button $B_2$ to replace real foreground image 410 with a selected image (a foreground image 430), as shown in FIG. 4C. If the user image (the real foreground image) and the real location (the real background image) of the user are hidden, the user can press button $B_4$ to replace real foreground image 410 and real background image 420 with selected images (foreground image 430 and background image 440), as shown in FIG. 4D.

Except for the user image and the location image, an embodiment of the method can further replace images of clothes, hair, or other location objects with selected images. Additionally, the foreground image, the background image, or both can be automatically abstracted or replaced with selected images according to user settings.

An embodiment of the system prevent a terminal user from retrieving real video data of a local user while communicating that automatically transmits predefined video data to the terminal user based on user settings, providing better security and flexibility.

Methods and systems of the present disclosure, or certain aspects or portions of embodiments thereof, may take the form of program code (i.e., instructions) embodied in media, such as floppy diskettes, CD-ROMS, hard drives, firmware, or any other machine-readable storage medium, wherein, when the program code is loaded into and executed by a machine, such as a computer, the machine becomes an apparatus for practicing embodiments of the disclosure. The methods and apparatus of the present disclosure may also be embodied in the form of program code transmitted over some transmission medium, such as electrical wiring or cabling, through fiber optics, or via any other form of transmission, wherein, when the program code is received and loaded into and executed by a machine, such as a computer, the machine becomes an apparatus for practicing and embodiment of the disclosure. When implemented on a general-purpose processor, the program code combines with the processor to provide a unique apparatus that operates analogously to specific logic circuits.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A mobile handheld device having a scenario simulation system, the mobile handheld device having communication functionality such that the mobile handheld device is operative to make a call, the mobile handheld device comprising:
an outline detection device configured to analyze and separate a plurality of images retrieved from an image input device of the mobile handheld device into a plurality of foreground and background images;
a foreground storage medium configured to store the foreground images;
a background storage medium configured to store the background images;
a foreground selector configured to select a foreground image from the foreground storage medium;
a background selector configured to select a background image from the background storage medium;
an image mixer configured to mix the foreground image with the background image as an output image; and
an image output module configured to transmit, while a call of the mobile handheld device is in progress, the output image to a remote multimedia device for replacing a real image on the remote multimedia device;
wherein the outline detection device comprising a feature extracting unit, an outline modeling unit, a texture constraining unit which is further collocated to constrain textures that are hard to be removed by the outline modeling unit, and a criterion detecting and connecting unit.

2. The scenario simulation system as claimed in claim 1, wherein the outline detection device analyzes and separates the real image to a real foreground image and a real background image, the background selector selects the background image from the background storage medium, the image mixer mixes the real foreground image with the background image as a simulation image, the image output module transmits the simulation image for replacing the real image on the remote multimedia device.

3. The scenario simulation system as claimed in claim 2, further comprising an activation button for activating the scenario simulation system.

4. The scenario simulation system as claimed in claim 3, further comprising a foreground replacement button for replacing the real foreground image with the foreground image.

5. The scenario simulation system as claimed in claim 3, further comprising a background replacement button for replacing the real background image with the background image.

6. The scenario simulation system as claimed in claim 3, further comprising a complete replacement button for simultaneously replacing the real foreground image and the real background image with the foreground image and the background image.

7. The scenario simulation system as claimed in claim 1, wherein at least one of the foreground images is a currently retrieved real image of the user.

8. The scenario simulation system as claimed in claim 7, wherein at least one of the background images is separated from the at least one of the foreground images.

9. The device as claimed in claim 1, wherein the foreground image corresponds to an image of the user acquired by the mobile handheld device.

10. A scenario simulation method for a mobile handheld device, the mobile handheld device having communication functionality such that the mobile handheld device is operative to make a call, the method comprising:
using a processor to perform the steps of:
retrieving a plurality of images from an image input device of the mobile handheld device by an outline detection process;
analyzing and separating the images to a plurality of foreground and background images by the outline detection process;
selecting a foreground image and a background image based on different conditions; and
mixing the foreground image with the background image as an output image transmitted while a call of the mobile handheld device is in progress;
wherein the outline detection process comprising a feature extracting process, an outline modeling process, a texture constraining process which is further collocated to constrain textures that are hard to be removed by the outline modeling process, and a criterion detecting and connecting process.

11. The scenario simulation method as claimed in claim 10, further comprising storing the foreground image and the background image in a foreground storage medium and a foreground storage medium respectively.

12. The scenario simulation method as claimed in claim 10, further comprising transmitting the output image for replacing a real image to a remote multimedia device.

13. The scenario simulation method as claimed in claim 12, further comprising:
analyzing and separating the real image to a real foreground image and a real background image;
selecting the background image from the background storage medium;
mixing the real foreground image with the background image as a simulation image; and
transmitting the simulation image for replacing the real image to be displayed on the remote multimedia device.

14. The scenario simulation method as claimed in claim 13, further comprising activating a scenario simulation system by using an activation button.

15. The scenario simulation method as claimed in claim 14, further comprising replacing the real foreground image with the foreground image by using a foreground replacement button.

16. The scenario simulation method as claimed in claim 14, further comprising replacing the real background image with the background image by using a background replacement button.

17. The scenario simulation method as claimed in claim 14, further comprising simultaneously replacing the real foreground image and the real background image with the foreground image and the background image by using a complete replacement button.

18. The scenario simulation method as claimed in claim 10, wherein at least one of the foreground images is a currently retrieved real image of the user.

19. The scenario simulation method as claimed in claim 18, wherein at least one of the background images is separated from the at least one of the foreground images.

20. The scenario simulation method as claimed in claim 10, wherein the foreground image corresponds to an image of the user acquired by the mobile handheld device.

21. A non-transitory computer-readable storage medium storing a computer program providing a scenario simulation method for a mobile handheld device, the mobile handheld device having communication functionality such that the mobile handheld device is operative to make a call, the method comprising using a computer to perform the steps of:

retrieving a plurality of images from an image input device of the mobile device by an outline detection process;

analyzing and separating the images to a plurality of foreground and background images by the outline detection process;

selecting a foreground image and a background image based on different conditions; and mixing the foreground image with the background image as an output image, while a call of the mobile handheld device is in progress;

wherein the outline detection process comprising a feature extracting process, an outline modeling process, a texture constraining process which is further collocated to constrain textures that are hard to be removed by the outline modeling process, and a criterion detecting and connecting process.

22. The non-transitory computer-readable storage medium storing a computer program providing a scenario simulation method for a multimedia device as claimed in claim 21, wherein the method further comprises:

analyzing and separating a real image to a real foreground image and a real background image;

selecting the background image;

mixing the real foreground image with the background image as a simulation image; and transmitting the simulation image for replacing the real image to a remote multimedia device.

23. The non-transitory computer-readable storage medium storing a computer program providing a scenario simulation method for a multimedia device as claimed in claim 22, wherein the method further comprises activating a scenario simulation system by using an activation button.

24. The non-transitory computer-readable storage medium storing a computer program providing a scenario simulation method for a multimedia device as claimed in claim 23, wherein the method further comprises replacing the real foreground image with the foreground image by using a foreground replacement button.

25. The non-transitory computer-readable storage medium storing a computer program providing a scenario simulation method for a multimedia device as claimed in claim 23, wherein the method further comprises replacing the real background image with the background image by using a background replacement button.

26. The non-transitory computer-readable storage medium storing a computer program providing a scenario simulation method for a multimedia device as claimed in claim 23, wherein the method further comprises simultaneously replacing the real foreground image and the real background image with the foreground image and the background image by using a complete replacement button.

27. The non-transitory computer-readable storage medium storing a computer program providing a scenario simulation method for a multimedia device as claimed in claim 21, wherein at least one of the foreground images is a currently retrieved real image of the user.

28. The non-transitory computer-readable storage medium storing a computer program providing a scenario simulation method for a multimedia device as claimed in claim 27, wherein at least one of the background images is separated from the at least one of the foreground images.

29. The non-transitory computer-readable storage medium as claimed in claim 21, wherein the foreground image corresponds to an image of the user acquired by the mobile handheld device.

* * * * *